Figures 1A, 1B:
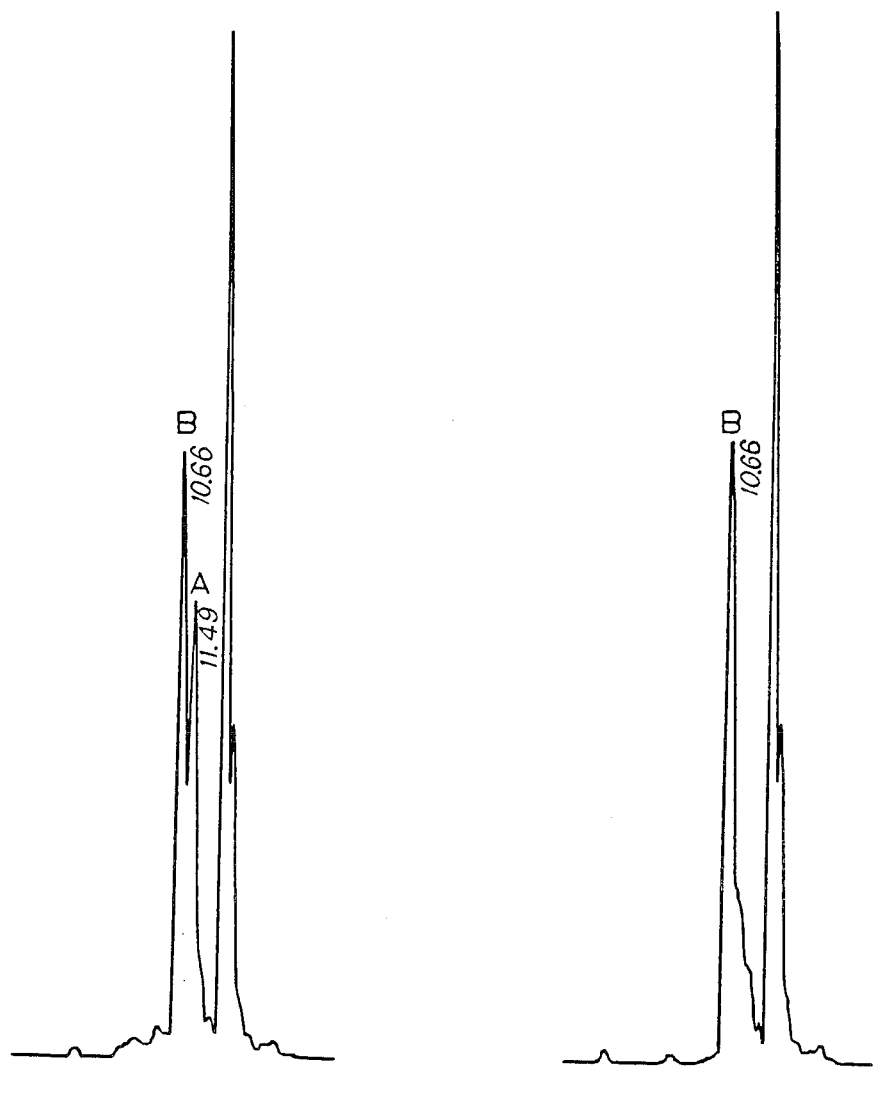

United States Patent [19]

Rialland et al.

[11] Patent Number: 4,782,138
[45] Date of Patent: Nov. 1, 1988

[54] PROCESS FOR SELECTIVELY SEPARATING THE ALPHA-LACTALBUMIN FROM THE PROTEINS OF WHEY

[75] Inventors: Jean-Paul Rialland, Retiers; Jean-Pierre Barbier, St-Erblon, both of France

[73] Assignee: Laiteries E. Bridel, s.a., Retiers, France

[21] Appl. No.: 876,491

[22] Filed: Jun. 17, 1986

[30] Foreign Application Priority Data

Jun. 17, 1985 [FR] France ................... 85 09153

[51] Int. Cl.$^4$ ................................. A23J 1/20
[52] U.S. Cl. ..................... 530/366; 426/543; 426/657; 530/410; 530/416; 530/833
[58] Field of Search .............. 530/366, 410, 416, 833; 426/657

[56] References Cited

U.S. PATENT DOCUMENTS

| | | | |
|---|---|---|---|
| 3,423,208 | 1/1969 | Kuipers | 530/833 X |
| 3,728,327 | 4/1973 | Frazeur et al. | 530/378 |
| 3,930,039 | 12/1975 | Kuipers | 530/833 X |
| 4,352,828 | 10/1982 | Rialland et al. | 530/416 X |
| 4,485,040 | 11/1984 | Roger et al. | 530/366 |

FOREIGN PATENT DOCUMENTS

| | | |
|---|---|---|
| 2155696 | 6/1973 | Fed. Rep. of Germany. |
| 1313085 | 4/1973 | United Kingdom. |

OTHER PUBLICATIONS

Chem. Abstracts, 85, 76484m, Marshall et al, 1976.

*Primary Examiner*—Howard E. Schain
*Attorney, Agent, or Firm*—Mason, Fenwick & Lawrence

[57] ABSTRACT

This invention relates to a process for selectively separating the alpha-lactalbumin from the proteins of whey; the process comprises a heat treatment of the whey previously concentrated to a dry matter content of 10 to 40% by weight, and acidified to a pH of less than 4, preferably from 3 to 3.5, said heat treatment being carried out at a temperature not exceeding 75° C., preferably from 45° to 75° C., for a duration of 15 seconds to 1 hour so as selectively to precipitate the alpha-lactalbumin; this heat treatment is followed by the recovery of the alpha-lactalbumin in the form of a precipitate and possibly of the other lacto-proteins remaining in solution in the residual whey. The process presents the advantage of being simple to carry out and being of low cost.

9 Claims, 1 Drawing Sheet

PROCESS FOR SELECTIVELY SEPARATING THE ALPHA-LACTALBUMIN FROM THE PROTEINS OF WHEY

The present invention relates to a process for separating the alpha-lactalbumin from the proteins of whey.

The proteins in whey are divided into three principal groups: lactalbumins, globulins and peptones. The lactalbumins include beta-lactoglobulin, alpha-lactalbumin and serum-albumin, and represent the major fraction of the proteins of whey. The beta-lactoglobulin is a protein characteristic of ruminants. Alpha-lactalbumin is found in the milk of all mammals and represents a major protein in human milk. It is largely used in the preparation of humanized milk, and for non-allergenic milk preparations containing casein and alpha-lactalbumin for feeding infants allergic to the beta-lactoglobulin of cow's milk.

Numerous methods have been proposed for separating all the proteins from whey together, for example by precipitation by heat, or by reaction with polyelectrolytes in order to form protein aggregates.

Other methods employ other precipitating agents such as carboxymethylcellulose, polyacrylic acid, polyphosphates or sodium laurylsulfate . . .

However, these processes do not enable the various proteins to be separated from the whey individually and the proteins recovered thereby do not present a good solubility; moreover, it is very difficult to eliminate the precipitatinq agent employed in these processes.

The concentration of the proteins of whey currently effected by ultrafiltration enables protein concentrates of good solubility to be obtained, but does not enable the different protein constituents of the whey to be separated from one another.

The protein constituents may be separated by chromatography over ion exchanger columns by placing in series a plurality of ion exchanger columns of different functions and by successively percolating the product to be treated over said columns; it is thus possible to separate the beta-lactoglobulin, the globulins and the alpha-lactalbumin.

However, this technology presents the drawback of being difficult to carry out and requiring heavy investment, the capacity of absorption of the lactoproteins on the ion exchangers being low: 100 mg of proteins/gram of exchanger.

The present inventors have observed that it was possible selectively to separate by precipitation the alpha-lactalbumin from the various proteins of the whey by a heat treatment of the whey previously brought to precise conditions of pH, ionic strength and of concentration.

The present invention therefore relates to a simple, low-cost process for selectively separating the alpha-lactalbumin from the proteins of whey, said process comprising a heat treatment of the whey previously concentrated to a dry matter content of 10 to 40% by weight, and acidified to a pH of less than 4, and preferably equal to 3–3.5, said heat treatment being carried out at a temperature not exceeding 75° C., preferably from 45° to 75° C., and more particularly from 50° to 55° C., for a duration of 15 seconds to 1 hour so as selectively to precipitate the alpha-lactalbumin, this heat treatment being followed by the recovery of the alpha-lactalbumih which has precipitated and possibly of the other lacto-proteins remaining in solution in the residual whey.

More particularly, the process according to the invention essentially comprises the following steps:

(1) concentration of the whey up to a dry matter content of 10 to 40% by weight, (2) acidification of the concentrated whey up to a pH of less than 4, preferably equal to 3–3.5, (3) heat treatment of the concentrated and acidified whey at a temperature not exceeding 75° C., preferably from 45° to 75° C., more particularly from 50° to 55° C., for a duration of 15 seconds to 1 hour, (4) recovery of the alpha-lactalbumin in the form of precipitate and possibly of the other lactoproteins remaining in solution in the residual whey.

According to a variant of the process, the steps of concentration and of acidification of the whey are reversed, and the process according to the invention comprises the following steps:

(1) acidification of the whey to a pH less than 4, and preferably equal to 3–3.5, (2) concentration of the acidified whey up to a dry matter content of 10 to 40% by weight, (3) heat treatment of the acidified and concentrated whey at a temperature not exceeding 75° C., preferably from 45° to 75° C., and more particularly from 50° to 55° C., for a duration of 15 seconds to 1 hour, (4) recovery of the alpha-lactalbumin in the form of a precipitate and possibly of the other lacto-proteins remaining in solution in the residual whey.

The whey which may be used in the present process may for example be a whey from a cheese-making plant obtained after coagulation of the milk by rennet or by lactic acidification, or a whey from a casein-factory obtained by lactic fermentation, direct acidification or by ion exchange of the milk.

The preferred wheys are casein-factory wheys and more particularly those obtained after separation

|  | Casein whey (by ion exchange method) | Casein whey (by hydrochloric acid method) | Whey from cheese-making plant |
|---|---|---|---|
| Dry mass (g/l) | 60–65 | 60–65 | 62–65 |
| Total nitrogenous matters % DE (N × 6.38) | 10.5 | 10.5–11.5 | 12.5 |
| Non-proteinic nitrogenous matter % DE (N) | 0.4 | 0.4–0.5 | 0.5–0.7 |
| Inorganic matters % DE | 7.25 | 10.5–12 | 8–8.5 |
| Fat % DE | 0.5 | 0.5 | 1 |
| pH | 4.6 | 4.6 | 6.0–6.4 |
| Calcium % DE | 1.2 | 1.8–2 | 0.5–0.65 |
| Sodium % DE | 0.45 | 0.7–0.9 | 0.7–0.75 |
| Potassium % DE | 1.25 | 2.4–2.6 | 2.2–2.4 |
| Chlorides % DE (expressed in NaCl) | 2.95 | 7.7.5 | 2.8–3.0 |

-continued

|  | Casein whey (by ion exchange method) | Casein whey (by hydrochloric acid method) | Whey from cheese-making plant |
|---|---|---|---|
| Phosphorus % DE | 1.25 | 1-1.3 | 0.55-0.7 |

DE = dry extract

The whey may be concentrated by the conventional means used in the dairy industry, such as for example thermal concentration in vacuo, reverse osmosis or ultrafiltration.

It is preferable to proceed by reverse osmosis as it enables the thermal shocks to be limited and avoids denaturation of the proteins. By reverse osmosis, the concentration is technically possible up to a dry matter content of 25%.

It is technically possible to effect concentration by ultrafiltration for a volumetric reduction of 5 to 10 volumes.

For a concentration of dry matter of less than 10%, no appreciable precipitation of alpha-lactalbumin is observed in the step of thermal treatment.

For a concentration of dry matter greater than 40%, the whey presents a high viscosity and separation of the precipitated proteins becomes delicate.

The pH of the whey may be adjusted by conventional techniques, for example by addition of acid or by cation exchange. Cation exchange effected on an ion exchanger resin in H+ form is preferred as it also enables the content of the inorganic ions to be reduced. Appropriate ion exchanger resins and the cation exchange techniques are those mentioned in French Pat. No. 80 08644 and in French patent application No. 82 12126.

When weakly acid cation exchanger resins are employed, the whole of the whey is treated on these resins until the desired pH is obtained.

When strongly acid cation exchanger resins are employed, part of the whey is firstly acidified up to a pH of 1.5 to 2, then it is mixed with the remaining whey to bring the pH of the whole to the desired value.

At a pH higher than or equal to 4, no selective precipitation of alpha-lactalbumin is observed in the subsequent heat treatment.

The lower limit of the pH range is 1.5, but there is no economic interest in going below pH 3.

The heat treatment is moderate and carried out at a temperature of less than or equal to 75° C., preferably from 45° to 75° C., and preferably still, from 50° to 55° C.

The duration of the treatment is between 15 seconds and 1 minute for the temperatures of 75° C. to 60° C. and from 1 minute to 1 hour for the temperatures of 60° C. to 45° C.

The upper limit of the temperature range is fixed at 75° C. to avoid denaturation of the proteins of the whey.

The lower limit at 45° C. is chosen in order to limit the duration of the treatment to an industrially reasonable length. At that temperature, the selective precipitation of the alpha-lactalbumin already requires a minimum duration of 1 hour; below 45° C., there is a risk of bacterial development.

The range of 50°-55° C. enables thermal denaturation of the lactoproteins to be avoided whilst allowing bacteriostatic protection.

The order of the acidification-concentration-heat treatment operations proves favourable when concentration is effected by evaporation in vacuo. In that case, when the concentration is conducted before acidification, there is risk of precipitation of the calcium salts and soiling of the concentrator; on the other hand, when acidification is conducted before concentration, the calcium salts are totally solubilized and maintained stable during the concentration operation.

The selectively precipitated protein fraction, in the present case alpha-lactalbumin, is separated by conventional known means: centrifugation, filtration, etc . . . The non-precipitated protein fractions contained in the residual whey may be separated into their constituents by chromatography or the residual whey containing the non-precipitated protein fractions may be concentrated by ultrafiltration in order to prepare a protein concentrate for special nutritional applications.

The modus operandi is generally as follows:

the fines of curds and the residual free fat are removed from the whey containing all the lactoproteins, by centrifugation. The skimmed and clarified whey is subjected to concentration by reverse osmosis at a temperature of from 10 to 55° C. and preferably at 50°-52° C. up to a dry extract content of 15 to 25%. The concentrated whey is acidified, preferably by ion exchange employing cation exchanger resins in H+ form and the cation exchanger techniques described in French Pat. No. 80 08644 and in application No. 82 12126, at a pH of between 3.0 and 3.5;

the concentrated acidified whey is treated thermally at a temperature of from 50° to 55° C. for 30 minutes to 1 hour in a vessel with moderate stirring;

the protein precipitate which essentially contains alpha-lactalbumin is separated by centrifugation then washed with a sufficient quantity of acidulated water;

the alpha-lactalbumin dispersed in the water or solubilized after neutralization is dried by atomization.

The invention will be described in the following non-limiting Examples.

EXAMPLE 1

Separation of the alpha-lactalbumin from casein whey (a) Concentration of the whey:

The fines of curds are removed from 100 l of casein whey at pH 4.6 (Dry extract 55 g/l) by centrifugal separation then said whey is subjected to concentration by reverse osmosis at 50° C. until a dry matter content of 20% is obtained (27.5 kg of concentrate).

(b) Acidification by ion exchange:

The concentrate of whey cooled to 8° C. is percolated through a column of 2 liters of cation exchanger resins in H+ form, "Duolite C26". The flowrate is about 7.5 kg/hour and the duration of the treatment is 3½ hours. The pH of the whey is lowered in this manner to 3.45.

(c) Heat treatment:

The acidified whey is heated via a plate exchanger to 52° C. and maintained at that temperature in a thermostated vessel for 30 minutes.

(d) Separation of the alpha-lactalbumin and drying:

The mixture cooled to 10° C. is subjected to centrifugal separation. The precipitated protein is separated and washed with 10 l of acidified water and subjected to further centrifugal separation. After dispersion in water, the product is dried by atomization. The alpha-lactalbumin is collected in the form of a powder, containing 4.75% humidity and 86.45% by weight of alpha-lactalbumin.

The supernatant liquid is subjected to analysis by high performance liquid chromatography in comparison with the starting whey; the chromatograms obtained are shown in FIGS. 1a and 1b of the accompanying drawings, for the starting whey (FIG. 1a) and for the residual whey after heat treatment and separation of the precipitated proteins (FIG. 1b). Peak A corresponding to the alpha-lactalbumin (retention time of 11.49 mins.) which is clearly seen in the chromatogram of the starting whey (FIG. 1a) has disappeared on the chromatograph of the residual whey (FIG. 1b). On the contrary, peak B corresponding to the beta-lactoglobulin (retention time of 10.66 mins.) is seen on both chromatograms.

Comparative test A (without prior concentration)

100 l of skimmed casein whey are acidified as before to a pH value of 3.43. After heating to 52° C., the whey is maintained at that temperature for 30 minutes.

No precipitation of proteins is produced; the temperature continues to be maintained for 30 more minutes without precipitation.

Comparative test B without acidification 100 l of skimmed casein whey are subjected to concentration by reverse osmosis until a dry extract of 20% is obtained then heated to 52° C. and maintained at that temperature for 1 hour. No precipitation of proteins is observed.

EXAMPLE 2

(a) Acidification by ion exchange:

The fines of curds are removed from 100 l of casein whey at pH 4.6 (dry extract 55 g/l ) by centrifugal separation, then cooled to 8° C. and percolated through a cation exchanger column in H+ form, "CCR2" by Dow Chemical until the pH of the whey is reduced to 3.45.

(b) Concentration of the whey:

The acidified whey is subjected to a concentration by reverse osmosis at 50° C. until a dry matter content of 20% is obtained.

(c) Heat treatment

The acidified and concentrated whey is treated as in Example 1; it is heated in a plate exchanger to 52° C. and maintained in a thermostated vessel for 30 minutes.

(d) Separation of the alpha-lactalbumin and dryinq:

The mixture cooled to 10° C. is subjected to centrifugal separation. The separated precipitated protein is washed with 10 l of acidified water and subjected to further centrifugal separation. After dispersion in water, the product is dried by atomization. The alpha-lactalbumin is collected in the form of a powder having the composition indicated in Example 1.

What is claimed is:

1. A proess for selectively separating the alpha-lactalbumin from the proteins of whey, said process comprising heat treating whey concentrated to a dry matter content of 10 to 40% by weight, and acidified to a pH of less than 4, said whey being concentrated and acidified in any order, said heat treating being carried out at a temperature not exceeding 75° C., for a duration of 15 seconds to 1 hour sufficient to selectively precipitate substantially alpha-lactalbumin, and recovering said alpha-lactalbumin in the form of a precipitate from the whey.

2. The process of claim 1, comprising the following steps:
    (1) concentration of the whey to a dry matter content of 10 to 40% by weight,
    (2) acidification of the concentrated whey to a pH of less than 4,
    (3) heat treatment of the concentrated and acidified whey at a temperature in the range from 45° to 75° C., for a duration of 15 seconds to 1 hour,
    (4) recovery of the alpha-lactalbumin in the form of precipitate from the whey and the other proteins remaining in solution in the residual whey.

3. The process of claim 1, comprising the following steps:
    (1) acidification of the whey to a pH less than 4,
    (2) concentration of the acidified whey to a dry matter content of 10 to 40% by weight,
    (3) heat treatment of the acidified and concentrated whey at a temperature in the range from 45° to 75° C., for a duration of 15 seconds to 1 hour,
    (4) recovery of the alpha-lactalbumin in the form of a precipitate from the whey and the other proteins remaining in solution in the residual whey.

4. The process of claim 1, wherein the concentration is effected by reverse osmosis to a dry matter content not exceeding 25% by weight.

5. The process of claim 1, wherein the heat treatment is carried out at a temperature of from 45° to 60° C., for a duration of 1 minute to 1 hour.

6. The processs of claim 1, wherein the heat treatment is carried out at a temperature of from 60° to 75° C. for a duration of 15 seconds to 1 minute.

7. The process according to claim 1, wherein the heat treatment is carried out at a temperature of 50° C. to 55° C.

8. The process of claim 1, wherein acidification of the whey is effected in the pH range of 3 to 3.5.

9. The process aof claim 1, wherein the acidification is effected by ion exchange with the aid of a cation exchanger resin in H+ form.

* * * * *

REEXAMINATION CERTIFICATE (1803rd)

United States Patent [19]

Rialland et al.

[11] B1 4,782,138

[45] Certificate Issued  Sep. 22, 1992

[54] PROCESS FOR SELECTIVELY SEPARATING THE ALPHA-LACTALBUMIN FROM THE PROTEINS OF WHEY

[75] Inventors: Jean-Paul Rialland, Retiers; Jean-Pierre Barbier, St-Erblon, both of France

[73] Assignee: Laiteries E. Bridel, Societe Anonyme, Retiers, France

Reexamination Request:
No. 90/002,202, Nov. 13, 1990

Reexamination Certificate for:
Patent No.: 4,782,138
Issued: Nov. 1, 1988
Appl. No.: 876,491
Filed: Jun. 17, 1986

[30] Foreign Application Priority Data

Jun. 17, 1985 [FR] France ............................... 85 09153

[51] Int. Cl.⁵ ............................................... A23J 1/20
[52] U.S. Cl. ..................................... 530/366; 426/657; 530/410; 530/416; 530/833
[58] Field of Search ............... 530/366, 410, 416, 833; 426/657

[56] References Cited

U.S. PATENT DOCUMENTS

| | | | |
|---|---|---|---|
| 3,423,208 | 1/1969 | Kuipers | 530/833 X |
| 3,728,327 | 4/1973 | Frazeur | 530/378 |
| 3,930,039 | 12/1975 | Kuipers | 530/833 X |
| 4,352,828 | 10/1982 | Rialland | 530/416 X |
| 4,485,040 | 11/1984 | Roger et al. | 530/366 |

FOREIGN PATENT DOCUMENTS

| | | |
|---|---|---|
| 2155696 | 6/1973 | Fed. Rep. of Germany . |
| 8808673 | 11/1988 | PCT Int'l Appl. . |
| 1313085 | 4/1973 | United Kingdom . |
| 1363783 | 8/1974 | United Kingdom . |

OTHER PUBLICATIONS

Chemical Abstracts, vol. 85, 76484m, Marshall et al., 1976.

R. J. Pearce, "Thermal Separation of Beta-lactoglobulin and Alpha-lactalbumin in Bovine Cheddar Cheese Whey", The Australian Journal of Dairy Technology, Dec. 1983.

*Primary Examiner*—Howard E. Schain

[57] ABSTRACT

This invention relates to a process for selectively separating the alpha-lactalbumin from the proteins of whey; the process comprises a heat treatment of the whey previously concentrated to a dry matter content of 10 to 40% by weight, and acidified to a pH of less than 4, preferably from 3 to 3.5, said heat treatment being carried out at a temperature not exceeding 75° C., preferably from 45° to 75° C., for a duration of 15 seconds to 1 hour so as selectively to precipitate the alpha-lactalbumin; this heat treatment is followed by the recovery of the alpha-lactalbumin in the form of a precipitate and possibly of the other lacto-proteins remaining in solution in the residual whey. The process presents the advantage of being simple to carry out and being of low cost.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 5-7 having been finally determined to be unpatentable, are cancelled.

Claims 1-3 and 9 are determined to be patentable as amended.

Claims 4 and 8 dependent on an amended claim, are determined to be patentable.

New claims 10-19 are added and determined to be patentable.

1. A [proess] *process* for selectively separating the alpha-lactalbumin from the proteins of whey, said process comprising heat treating whey concentrated to a dry matter content of 10 to 40% by weight, and acidified to a pH of less than 4, said whey being concentrated and acidified in any order, said heat treating being carried out at a temperature [not exceeding 75° C.,] *of from 60° C. to 75° C.* for a duration of 15 seconds to 1 [hour] *minute* sufficient to selectively precipitate substantially alpha-lactalbumin, and recovering said alpha-lactalbumin in the form of a precipitate from the whey.

2. The process of claim 1, comprising the following steps:
(1) concentration of the whey to a dry matter content of 10 to 40% by weight,
(2) acidification of the concentrated whey to a pH of less than 4,
(3) heat treatment of the concentrated and acidified whey at a temperature in the range from [45°] *60°* to 75° C. [,] for a duration of 15 seconds to 1 [hour] *minute, and*
(4) recovery of the alpha-lactalbumin in the form of *a* precipitate from the whey and the other proteins remaining in solution in the residual whey.

3. The process of claim 1, comprising the following steps:
(1) acidification of the whey to a pH less than 4,
(2) concentration of the acidified whey to a dry matter content of 10 to 40% by weight,
(3) heat treatment of the acidified and concentrated whey at a temperature in the range from [45°] *60°* to 75° C. [,] for a duration of 15 seconds to 1 [hour,] *minute, and*
(4) recovery of the alpha-lactalbumin in the form of a precipitate from the whey and the other proteins remaining in solution in the residual whey.

9. The process [aof] *of* claim 1, wherein the acidification is effected by ion exchange with the aid of a cation exchanger resin in H+ form.

*10. A process for selectively separating the alpha-lactalbumin from the proteins of whey comprising heat treating said whey at a temperature of about 52° C. for a duration of about 30 minutes, said whey prior to heat treating being concentrated by reverse osmosis to a dry matter content of about 20% by weight and acidified to pH of 3.45.*

*11. A process for selectively separating the alpha-lactalbumin from the proteins of whey, said process comprising the steps of:*
*(a) concentration of said whey by reverse osmosis to a dry matter content of about 15-25% by weight;*
*(b) acidification of said whey concentrated in step (a) to a pH of about less than 3.5; and*
*(c) heating said whey from step (b) at a temperature of about 50°-55° C. for about 30 minutes to 1 hour.*

*12. A process for selectively separating the alpha-lactalbumin from the proteins of whey, said process comprising heat treating whey concentrated to a dry matter content of 10 to 40% by weight, and acidified to a pH of less than 3.5, said whey being concentrated and acidified in any order, said heat treating being carried out at a temperature not exceeding 75° C. for a duration of 15 seconds to 1 hour sufficient to selectively precipitate substantially alpha-lactalbumin, and recovering said alpha-lactalbumin in the form of a precipitate from the whey.*

*13. The process according to claim 12, comprising the following steps:*
*(1) concentration of the whey to a dry matter content of 10 to 40% by weight,*
*(2) acidification of the concentrated whey to a pH of less than 3.5,*
*(3) heat treatment of the concentrated and acidified whey at a temperature in the range from 45° to 75° C. for a duration of 15 seconds to 1 hour,*
*(4) recovery of the alpha-lactalbumin in the form of precipitate from the whey.*

*14. The process according to claim 12, comprising the following steps:*
*(1) acidification of the whey to a pH less than 3.5,*
*(2) concentration of the acidified whey to a dry matter content of 10 to 40% by weight,*
*(3) heat treatment of the acidified and concentrated whey at a temperature in the range from 45° to 75° C. for a duration of 15 seconds to 1 hour, and*
*(4) recovery of the alpha-lactalbumin in the form of precipitate from the whey.*

*15. The process of claim 12, wherein, when said heat treatment is carried out at a temperature from 45° to 60° C., the duration of said treatment is 1 minute to 1 hour, and when said heat treatment is carried out at a temperature from 60° to 75° C., the duration of said treatment is 15 seconds to 1 minute.*

*16. The process of claim 12, wherein acidification of the whey is effected in the Ph range of 3 to less than 3.5.*

*17. The process of claim 12, wherein the acidification is effected by ion exchange with the aid of a cation exchanger resin in the H+ form.*

*18. In a process for selectively separating the alpha-lactalbumin from the proteins of whey, said process comprising heat treating whey concentrated to a dry matter content of 10% to 40% by weight, and acidified to a Ph of less than 4.0, said whey being concentrated and acidified in any order, said heat treating being carried out at a temperature not exceeding 75° C., the improvement comprising:*
*carrying out said heat treating for a duration of from 15 seconds to 1 hour sufficient to selectively precipitate substantially alpha-lactalbumin, and recovering said* alpha-lactalbumin in the form of a precipitate from the whey, and wherein, when said heat treatment is carried out at a temperature from 45° C. to 60° C., the duration of said treatment is adjusted to between 1 minute and 1 hour sufficient to selectively precipitate substantially alpha-lactalbumin; and when said heat treatment is carried out at a temperature of from 60° C. to 75° C., the duration of said treatment is adjusted to between 15 seconds to 1 minute sufficient to selectively precipitate substantially alpha-lactalbumin.

19. In a process for selectively separating the alpha-lactalbumin from the proteins of whey, said process comprising heat treating whey concentrated to a dry matter content of 10% to 40% by weight, and acidified to a pH of 3.0 to 3.5, said whey being concentrated and acidified in any order, said heat treating being carried out at a temperature not exceeding 75° C., the improvement comprising:

carrying out said heat treating for a duration of from 15 seconds to 1 hour sufficient to selectively precipitate substantially alpha-lactalbumin, and recovering said alpha-lactalbumin in the form of a precipitate from the whey.

* * * * *